Dec. 16, 1969  N. F. PRATT  3,483,750
GAS TURBINE INLET TEMPERATURE MEASURING SYSTEM
Filed Feb. 1, 1967  2 Sheets-Sheet 1
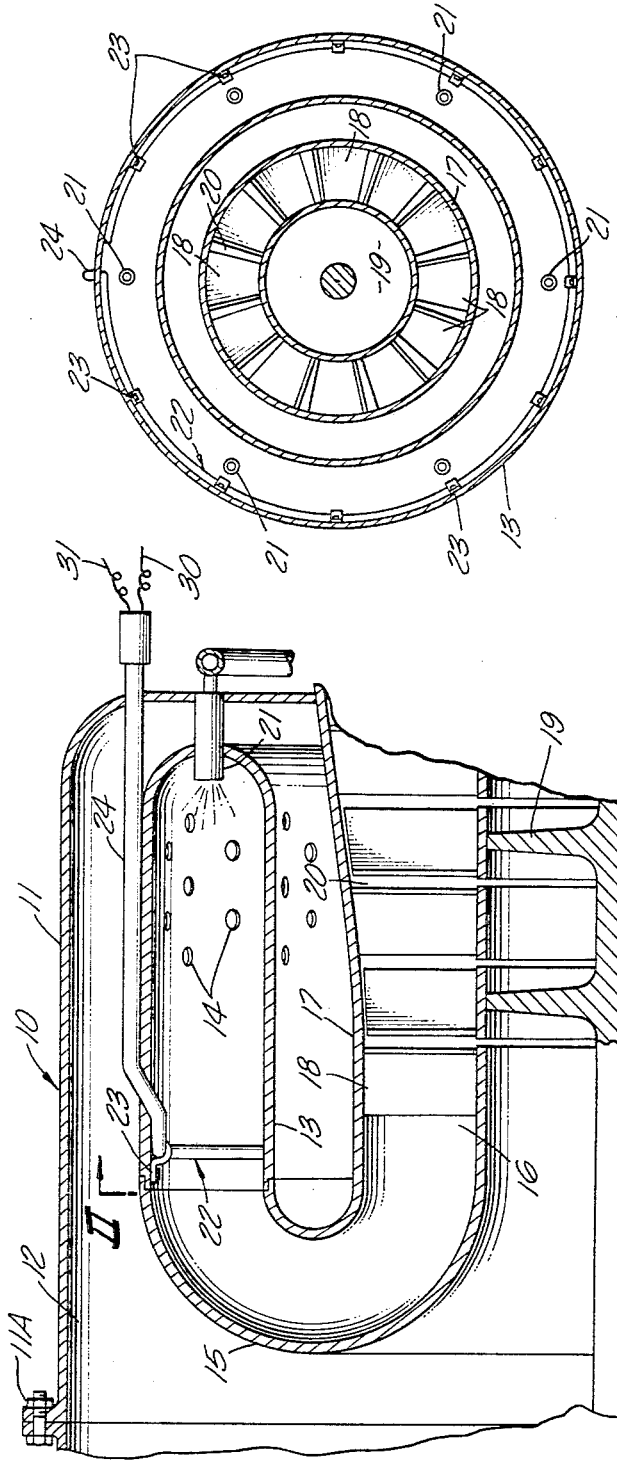
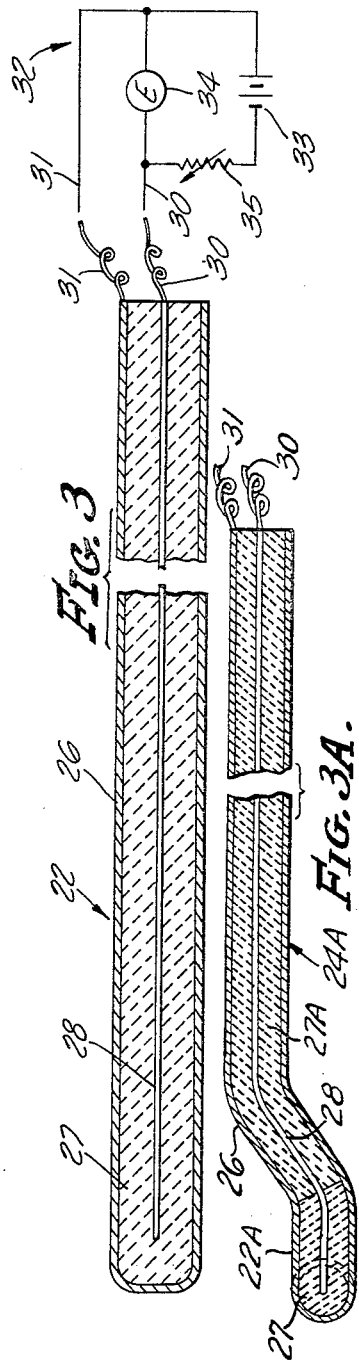
INVENTOR.
NORMAN F. PRATT
BY
Herschel C. Omohundro
ATTORNEY Dec. 16, 1969 N. F. PRATT 3,483,750
GAS TURBINE INLET TEMPERATURE MEASURING SYSTEM
Filed Feb. 1, 1967 2 Sheets-Sheet 2

INVENTOR.
NORMAN F. PRATT
BY
Herschel C. Omohundro
ATTORNEY

United States Patent Office 3,483,750
Patented Dec. 16, 1969

3,483,750
GAS TURBINE INLET TEMPERATURE
MEASURING SYSTEM
Norman F. Pratt, Scottsdale, Ariz., assignor to The Garrett Corporation, Los Angeles, Calif., a corporation of California
Filed Feb. 1, 1967, Ser. No. 613,341
Int. Cl. G01k 1/08
U.S. Cl. 73—346                                16 Claims

ABSTRACT OF THE DISCLOSURE

The system has a sensor with electrical conductors spaced by insulating material the electrical resistance of which varies as a function of temperature. The sensor extends across the gas stream and is connected with a remotely located electrical circuit for measuring the changes in resistance. An indicator in the circuit is responsive to the changes in resistance to show the average temperature of the gas stream.

BACKGROUND OF THE INVENTION

This invention pertans to measuring systems of the type useful for determining the temperature of a stream of flowing fluids. More particularly, it pertains to a system for determining the average temperature of a stream of hot gases flowing into the inlet of a gas turbine.

In the majority of gas turbine engines, a combustion chamber is provided between an air compressing means and the turbine. When the engine is operated, fuel is mixed with compressed air and burned in the combustion chamber to provide hot gases which are directed through a nozzle means against the blades of the turbine wheel to effect rotation thereof. To secure most efficient operation and maximum life of the engine, the temperature of the gas passage between the combustor and inlet nozrange. Due to the size, shape, length, and other features of the gas passage between the combustor and inlet nozzles, as well as the high temperatures and possible localized variations of temperature of the gasses flowing therethrough, the accurate determination of the average temperature at the turbine inlet presents a difficult problem.

SUMMARY OF THE INVENTION

The primary object of this invention is to provide a simple, dependable, relatively inexpensive method of and means for measuring the integrated average temperature of gases in the inlet of a gas turbine.

It is an object to provide a system for determining the average temperature of a stream of flowing fluids, the system having a novel temperature sensing device which is adaptable to all shapes of passages whereby all points across the gas stream from one side to the other or completely around an annular stream can be simultaneously checked and the average temperature substantially instantly and accurately ascertained.

Specifically, an object is to provide a means for measuring the inlet temperature of a gas turbine, such means having a sensor element to be directly engaged by the gases and affected in a particular manner by temperature changes in the gases, the element being connected in a remotely located electrical circuit having an indicator responsive to the temperature induced changes in the sensor to show the average temperature of the gas stream.

A further object is to provide a temperature sensor having a pair of elongated conductors spaced by a body of ceramic insulating material the electrical resistance of which varies as a function of temperature. This sensor is extended transversely of the gas stream and engaged by the gases whereby the average temperature will be sensed even though the temperatures vary across the stream.

A further object is to construct the sensor of the preceding paragraph with an outer metallic sheath enclosing a body of ceramic insulating material, such as magnesium oxide, aluminum oxide, or the like, surrounding a central conductor, the insulating material having an electrical resistance which varies as a function of temperature. With such a sensor, the temperatures of hot spots in the gas passage will be included in the average temperature and thus affect the operation of the measuring circuit and steps may be taken to avoid excessive or destructive temperatures. Turbine life may in this manner be prolonged.

It is also an object of the invention to provide the sensor mentioned in the preceding paragraphs with a section leading from the portion exposed to the hot gases through other less highly heated regions to the exteriorly disposed measuring circuit, the lead section being of similar construction but having a ceramic insulating body of different material which may be less responsive to the heat, thus insuring that the temperatures being indicated are those in the hot gas or other required zones.

BRIEF DESCRIPTION OF THE DRAWINGS

In the accompanying drawings:
FIG. 1 is a fragmentary axial sectional view taken through the combustor and turbine portion of a gas turbine engine with the sensor of the turbine inlet average temperature measurement system of the present invention incorporated therein;
FIG. 2 is a detail transverse sectional view taken through the combustor and associated portion of the engine shown in FIG. 1 on the plane indicated by the line II—II of FIG. 1;
FIG. 3 is a detail longitudinal sectional view taken through a temperature sensor forming part of the system, an electrical measuring circuit employed in the system being included in this view;
FIG. 3A is a similar view of a modified form of temperature sensor.

DESCRIPTION OF THE PREFERRED EMBODIMENT

Figure 4:
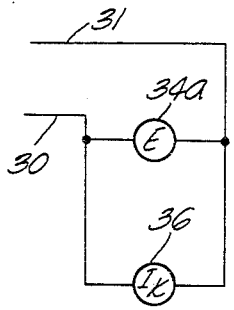
FIGS. 4 and 5 are modified electrical measuring circuits which may be used in the system.

Referring more particularly to FIGS. 1 and 2 of the drawing, the numeral 10 designates generally the turbine end of a gas turbine engine. This end of the engine includes a housing 11 constituting a plenum 12 for receiving compressed air from the compressor section (not shown) of the engine. The plenum encloses, in the form of engine illustrated, an annular combustor device 13 having a plurality of openings 14 formed therein to admit air from the plenum to the interior of the combustor. At its forward end the combustor communicates with a return bend portion 15 which in turn communicates, as at 16, with the inlet to the turbine 17. As usual, the turbine includes inlet nozzle vanes 18 and a plurality of wheels 19 the blades of which are disposed in a gas passage 20 leading from the inlet 16 to a point of discharge.

The combustor 14 has one or more atomizing nozzles 21 connected therewith through which fuel may be sprayed into the combustor to be mixed with the compressed air and burned to provide gases to effect the operation of the turbine.

The invention herein is directed to a method of and means for determining the average temperature of the gases flowing from the combustor to the turbine inlet. To effect the objects of the invention, use is made of a sensor 22 which constitutes an elongated element disposed to extend completely around the annular combustor, as shown in FIG. 2, the element 22 being secured in this instance to the outer wall of the combustor by clips 23. In this manner the sensor element is arranged to extend transversely of or across the path of the gases flowing from the combustion chamber to the turbine inlet nozzle vanes 18. The element will thus see or be exposed to the temperatures existing completely around the annular gas passage as shown in FIG. 2. The element has a lead portion 24 projecting through the outer wall of the combustor and extending rearwardly therefrom through the housing 11 for connection with an electrical measuring circuit. This manner of mounting the sensor 22 permits the ready removal and replacement thereof for necessary service and/or repair merely by loosening fastening elements 11A and sliding the housing 11 and combustor 13 rearwardly away from the return bend section 15. No dismantling of the rotating assembly of the turbine is required.

Figure 6:
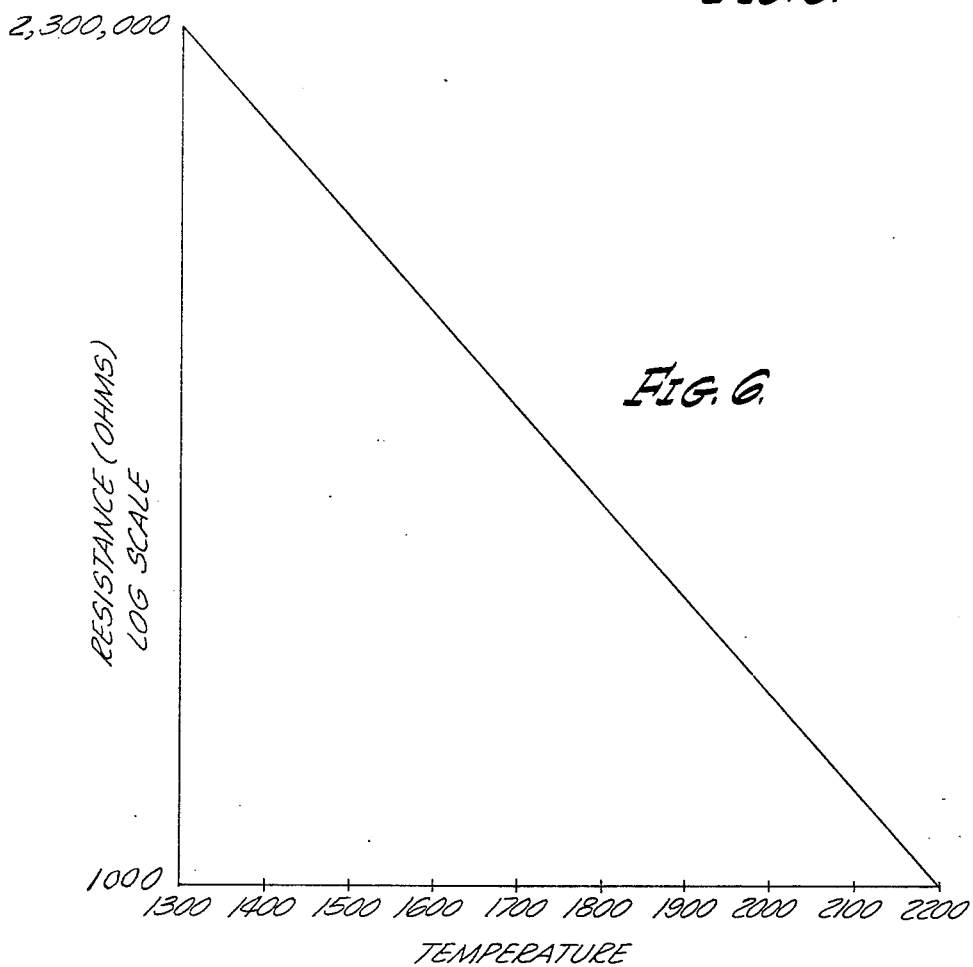
FIG. 6 is a graph with a curve showing the resistance of a ceramic insulating material suitable for use in the invention relative to various temperatures.

As shown in FIG. 3, the sensor 22 includes an outer meallic sheath 26 surrounding a ceramic insulating body 27 in which is embedded a centrally disposed electrical conductor 28. The sensor 22 may be formed by disposing the conductor 28 and ceramic insulating material in the sheath and swaging the assembly to compact the material between the sheath and the central conductor. The ceramic material may be magnesium oxide, aluminum oxide, or other substance having the desired characteristic of providing an electrical resistance which varies as the function of temperature, typically as shown in FIG. 6. In a system embodying the invention actually constructed for test purposes, the sensor was made of a piece of swaged MgO with an Inconel sheath. In the modified form of the invention, shown in FIG. 3A, the sensor 22A is constructed with the lead section 24A provided with insulating material 27A having an electrical resistance differing from that of the ceramic material 27 in the portion of the sensor exposed directly to the gases. This construction is employed to secure the above-recited object of insuring that the temperatures being indicated are those in the hot gas zone only.

It will be noted that when the sensor is disposed as illustrated it will extend transversely of the stream of gases completely around the annular combustor. The sensor will thus be exposed to the flow of gases and be responsive to the heat therein, whether the temperature of the gases is uniform or variable.

As indicated in FIG. 3, lead wires 30 and 31 are extended from the sheath and the central conductor, respectively, to an indicating circuit designated generally by the numeral 32. This circuit includes a current source 33 connected at opposite sides with the leads 30 and 31. A voltmeter or other suitable measuring instrument 34 is connected between the leads 30 and 31 to show the change in electrical resistance of the ceramic insulating material in accordance with the temperature changes. The initial position of the needle of the instrument 34 may be adjusted through the operation of a variable resistance element 35 disposed in one of the connections between the current source and one lead of the sensor. As the sensor is exposed to varying temperatures, the electrical resistance of the ceramic insulating material will change and cause movement of the indicating needle of the instrument 34 relative to a scale provided on the instrument. This scale may be calibrated and provided with indicia to show temperature.

Figure 5:
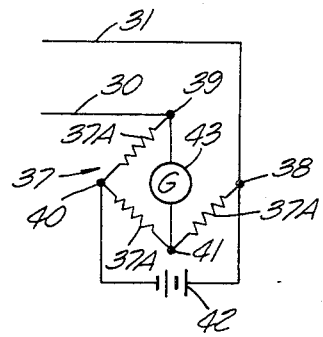

The indicating circuits shown in FIGS. 4 and 5 may be employed instead of the voltage divider circuit illustrated at 32. In FIG. 4, a constant current source 36 is substituted for the source 33 indicated in the circuit 32. The modified circuit of FIG. 4 also utilizes a meter 34A connected across the leads from the current source. In FIG. 5, a bridge 37 is utilized, the electrical resistance element formed by the sensor 22 serving as one arm of the bridge. Other suitable resistances 37A are connected in a conventional manner to serve as the other arms of the bridge 37 and provide terminals 38, 39, 40, and 41 between adjoining arms. The current source 42 has one side connected with the terminal 38 of the bridge with which lead 31 of the sensor is connected. The other side of the current source is connected with the opposite terminal 40 of the bridge. An electrical measuring instrument 43 is connected between the remaining terminals 39 and 41 of the bridge, the terminal 39 being connected with the other lead 30 from the sensor 22.

In all forms of measuring circuits shown, the meter will show the change in electrical resistance of the ceramic insulating material in accordance with temperature changes. This indication may be compared with a scale graduated to indicate temperatures, as previously pointed out. The current sources indicated are direct current; however, alternating current system may also be used with similar effectiveness.

I claim:
1. Means for measuring the inlet temperature of a gas turbine of the type having a combustor communicating via a gas passage with the inlet nozzle of the turbine, comprising;
  (a) a unitary sensing means adapted to be supported in a plane extending transversely of the gas passage between the combustor and inlet nozzle of the turbine, said sensing means passing through at least three points spaced angularly around the center of said plane and having a pair of elongated electrical conductors spaced by a body of a ceramic insulating material the electrical resistance of which varies as a function of temperature; and
  (b) an electrical measuring circuit connected with said spaced conductors and communicating with a source of elecrical power, said circuit having an indicator electrically connected with leads extending from the conductors of said sensing means to show changes in resistance of said insulating material in response to temperature change.

2. Means for measuring the inlet temperature of a gas turbine as set forth in claim 1 in which the sensing means consists of a metallic sheath encasing a ceramic insulating body and a substantially coextensive center conductor.

3. Means for measuring the inlet temperature of a gas turbine as set forth in claim 1 in which the sensing means consists of a pair of concentric elongated conductors with the ceramic insulating material compacted therebetween.

4. Means for measuring the inlet temperature of a gas turbine as set forth in claim 1 in which the ceramic insulating material is magnesium oxide.

5. Means for measuring the inlet temperature of a gas turbine as set forth in claim 1 in which the elongated sensing means extends completely around an annular gas passage connecting the combustor and inlet nozzle of the turbine to sense the average temperature of the gases flowing therethrough.

6. Means for measuring the inlet temperature of a gas turbine as set forth in claim 1 in which the sensing means has a first portion exposed to the gases flowing from the combustor to the turbine inlet nozzle and a second portion leading from the first portion for connection to the electrical measuring circuit, the ceramic insulating materials of the first and second portions having different electrical resistance characteristics.

7. Means for measuring the inlet temperature of a gas turbine as set forth in claim 1 in which the electrical measuring circuit has a means for adjusting the initial position of said indicator.

8. Means for measuring the inlet temperature of a gas turbine as set forth in claim 1 in which the electrical measuring circuit is of the voltage divider type having an electrical power source adapted to be connected at opposite sides with the spaced electrical conductors of said sensing means, a variable resistor in the connection between one side of said power source and said sensing means, and an indicating device connected across the connections between said power source and sensing means on the sensing means side of said variable resistor.

9. Means for measuring the inlet temperature of a gas turbine as set forth in claim 1 in which the electrical measuring circuit has a bridge, the resistor provided by said sensing means forming one leg of said bridge, the power source being connected at one side with one lead of said sensing means and the adjacent legs of the bridge and at the other side with the terminal between the other sides of said bridge, and an indicator connected with the other lead of said sensing means and the opposite terminal of said bridge.

10. Means for sensing the average temperature in a stream of flowing fluid, comprising:
(a) means forming a confined passage for the stream of flowing fluid;
(b) a pair of electrical conductors supported in said means, said conductors being arranged in planes extending transversely of said passage and exposed to the temperature of the fluid stream in at least three regions spaced angularly around the center of said planes; and
(c) a body of ceramic insulating material spacing said conductors, said material having an electrical resistance which varies as a function of temperature.

11. Means for sensing the average temperature in a stream of flowing fluid as set forth in claim 10 in which the electrical conductors are uniformly spaced throughout the length of the sensing means.

12. Means for sensing the average temperature in a stream of flowing fluid as set forth in claim 10 in which the electrical conductors consist of a sheath and an axially extending element disposed therein.

13. Means for sensing the average temperature in a stream of flowing fluid as set forth in claim 10 in which the insulating material is selected from the group consisting of MgO and $Al_2O_3$ and swaged around a conductor within an electrical conducting sheath.

14. The method of determining the average temperature of a stream of flowing gases comprising the steps of:
(a) supporting a body of insulating material the electrical resistance of which varies as a function of temperature in the stream with the body extending from one side of the stream to the other;
(b) applying an electric current to opposed sides of the insulating body throughout the length thereof; and
(c) measuring the current during the application thereof to the insulating material to indicate the change in resistance of the insulating material.

15. The method of determining the average temperature of a stream of flowing gases as set forth in claim 14 in which the change in resistance of the insulating material is compared with a scale graduated to show temperatures.

16. The method of determining the average temperature of a stream of flowing gases as set forth in claim 14 in which the stream has an annular cross section and the body of insulating material extends completely around such annular cross section.

References Cited

UNITED STATES PATENTS

| 2,021,491 | 11/1935 | Ruben. |
| 2,546,415 | 3/1951 | Alcock. |
| 2,742,756 | 4/1956 | De Boisblanc. |
| 3,089,339 | 5/1963 | Rogers et al. |
| 3,174,342 | 3/1965 | Werner et al. |
| 3,295,087 | 12/1966 | Landis et al. |
| 3,367,186 | 2/1968 | Ensign et al. |

LOUIS R. PRINCE, Primary Examiner

F. SHOON, Assistant Examiner

U.S. Cl. X.R.

73—342, 349, 362